United States Patent Office 3,451,973
Patented June 24, 1969

3,451,973
PREPARATION OF POLYETHYLENE TEREPHTHALATE USING CYANIDE ESTERIFICATION CATALYST
Mary J. Stewart, Riddlewood, Media, and John A. Price, Swarthmore, Pa., assignors to FMC Corporation, Philadelphia, Pa., a corporation of Delaware
No Drawing. Filed Feb. 3, 1967, Ser. No. 613,770
Int. Cl. C08g 17/04, 39/02
U.S. Cl. 260—75     5 Claims

ABSTRACT OF THE DISCLOSURE

Process of preparing polyethylene terephthalate comprising carrying out a transesterification reaction between dimethyl terephthalate and ethylene glycol in the presence of a cyanide selected from the group consisting of cadmium cyanide, zinc cyanide, and calcium cyanide.

---

This invention relates to a method of preparing filament-forming linear polyesters. More particularly, it relates to an improved method for preparing filament-forming polyethylene terephthalate through the use of a transesterification catalyst.

The manufacture of filament-forming polyester resin from a dialkyl terephthalate and glycol is well-known in the art. Generally, in the preparation of such polyesters, a dialkyl terephthalate and glycol are first combined and subjected to an ester-interchange reaction or transesterification reaction in the presence of an ester-interchange catalyst at elevated temperature and atmospheric pressure. The resulting product or prepolymer is then polycondensed at higher temperatures and under reduced pressure in the presence of a polycondensation catalyst to form the desired filament-forming polyester resin.

In general, a polyethylene terephthalate resin suitable for melt spinning into filaments should have a carboxyl content value of about or below 50 equivalents per million grams (eq./$10^6$ gr. or meq./kg.). Additionally, a polyethylene terephthalate suitable for such use should have a melting point of at least about 258–260° C. and an intrinsic viscosity of not less than about 0.60, as determined in a 60% phenol and 40% tetrachloroethane solution (wt./wt.) at 30° C.

From a commercial standpoint, it is essential that the polyester resin be produced in the shortest possible time and the desired degree of polymerization be obtained. One way of evaluating the effectiveness of a transesterification catalyst is by measuring the "half-time" of the catalyst. The "half-time" is defined as the time necessary for the first one-half of the theoretical amount of methyl alcohol that will be produced during the transesterification reaction to distill from the transesterification mixture. It is desirable that the half-time be as short as possible; however, it is essential that the transesterification catalyst in any case acts to produce a polyester prepolymer suitable for polycondensation to a high molecular weight polyester.

It is an object of this invention to provide a method for preparing polyethylene terephthalate resin.

Another object of the present invention is to prepare polyethylene terephthalate resin suitable for spinning into processable filaments.

An additional object of the present invention is to provide an improved method for accelerating the transesterification method between ethylene glycol and dimethyl terephthalate in the preparation of polyethylene terephthalate.

These and other objects are accomplished in accordance with the present invention which involves a method of preparing polyethylene terephthalate resin wherein dimethyl terephthalate and ethylene glycol are transesterified and the resulting transesterified product is polycondensed in the presence of a polycondensation catalyst, the improvement comprising carrying out the said transesterification reaction in the presence of a catalytic amount of a cyanide selected from the group consisting of cadmium cyanide, zinc cyanide, and calcium cyanide or any combination thereof.

Generally, concentrations of the present transesterification catalysts in the range of from about 0.01% to about 0.2%, based on the weight of dimethyl terephthalate in the subject dimethyl terephthalate-ethylene glycol reaction mixture is used. Usually, it has been found that from about 0.02% to about 0.10% of the present cyanides, based on the weight of the dimethyl terephthalate in the reaction mixture, is preferred to produce linear polyester resins suitable for forming filaments. Higher or lower concentrations of the present catalysts can also be used. However, when concentrations less than the above are used, their catalytic effect is generally reduced, whereas if concentrations greater than this are used, no further improvement in the present method or desired product is obtained.

In general, the preparation of filament-forming polyesters of the present invention via the ester-interchange reaction is carried out with a molar ratio of ethylene glycol to dimethyl terephthalate of from about 1:1 to about 15:1, but preferably from about 1.2:1 to about 2.6:1. The ester-interchange reaction is generally carried out at atmospheric pressure in an inert atmosphere such as nitrogen, initially at a temperature range of from about 125° C. to about 250° C., but preferably between about 150° C. and 200° C. in the presence of an ester-interchange catalyst. During this first stage, methyl alcohol is evolved and is continuously removed by distillation. After a reaction period of about one hour, the temperature of the reaction mixture is raised to about from 200° C. to about 300° C. for approximately 3 to 5 hours in order to complete the reaction and distill off excess glycol. The main and desired product of the ester-interchange reaction is the prepolymer which is comprised principally of bis(2 - hydroxyethyl) terephthalate. The second stage of polycondensation step of the present method is generally achieved under reduced pressure within the range of about 0.05 to 20 mm. of mercury in the absence of an oxygen-containing gas at temperatures ranging from about 260° C. to about 325° C. for about 2 to 6 hours. It is preferable to carry out both the first and second stages of the present method under agitation.

The polycondensation step of the present method is generally accomplished through the addition of a suitable catalyst, for example, antimony trioxide and the like. The polycondensation catalyst may be added to the present reaction mixture before initiating the ester-interchange reaction between the ethylene glycol and dimethyl terephthalate or after the product thereof is formed. The polycondensation catalysts are generally employed in amounts ranging from about 0.005 to about 0.5%, based on the total weight of reactants.

The following examples of several preferred embodiments will further serve to illustrate the present invention. All parts are by weight, unless otherwise indicated.

EXAMPLE I

A mixture comprising 600 grams of dimethyl terephthalate, 396 mls. of ethylene glycol and 0.24 gram of cadmium cyanide was charged into a reaction vessel equipped with a nitrogen inlet, a distillation arm, heating means and stirring means. The reaction mixture was agitated and heated at atmospheric pressure to about 197° C. over a period of about 30 minutes under a nitrogen blanket whereby by-product methyl alcohol was distilled off. The reaction mixture was held at about 197° C. for about 2 hours. Then, the temperature of the reaction mixture was allowed to rise in order to distill off any remaining by-product comprising methyl alcohol and excess ethylene glycol, and form the desired polyester prepolymer product. After about 30 minutes, the temperature had risen to about 230° C. at which time the formed prepolymer was cooled under a nitrogen blanket.

The half-time of the cadmium cyanide catalyst was twenty minutes.

EXAMPLE II 50 grams of the resulting prepolymer of Example I was combined with 0.02 gram of antimony trioxide in a reaction vessel equipped with a nitrogen inlet, a vacuum source, a distillation arm, stirring means, and heating means. The pressure within the reaction vessel was reduced to from about 0.1 to about 0.05 mm. of mercury at 285° C. under a nitrogen blanket and the reaction mixture was agitated under these conditions for about three hours to bring about the polycondensation of the prepolymer and formation of the polyester resin. The resin product obtained had an intrinsic viscosity of 1.02, a melting point of about 264° C. and a carboxyl content value of 18.2 (meq./kg.).

EXAMPLE III

A mixture comprising 600 grams of dimethyl terephthalate, 396 mls. of ethylene glycol and 0.24 gram of calcium cyanide was charged into a reaction vessel equipped with a nitrogen inlet, a distillation arm, heating means and stirring means. The reaction mixture was agitated and heated at atmospheric pressure to about 197° C. over a period of about 30 minutes under a nitrogen blanket whereby by-product methyl alcohol was distilled off. The reaction mixture was held at about 197° C. for about 2 hours. Then, the temperature of the reaction mixture was allowed to rise in order to distill off any remaining by-product comprising methyl alcohol and excess ethylene glycol, and form the desired polyester prepolymer product. After about 30 minutes, the temperature had risen to about 230° C. at which time the formed prepolymer was cooled under a nitrogen blanket.

The half-time of the calcium cyanide catalyst was thirty-five minutes.

EXAMPLE IV

Fifty grams of the prepolymer product of Example III was combined with 0.02 gram of antimony trioxide in a reaction vessel equipped with a nitrogen inlet, a vacuum source, a distillation arm, stirring means, and heating means. The pressure within the reaction vessel was reduced to from about 0.1 to about 0.05 mm. of mercury at 285° C. under a nitrogen blanket and the reaction mixture was agitated under these conditions for about three hours to bring about the polycondensation of the prepolymer and formation of the polyester resin. The resin product obtained had an intrinsic viscosity of 0.98, a melting point of about 265° C., and a carboxyl content value of 8.3 (meq./kg.).

EXAMPLE V

A mixture comprising 600 grams of dimethyl terephthalate, 396 mls. of ethylene glycol and 0.24 gram of zinc cyanide was charged into a reaction vessel equipped with a nitrogen inlet, a distillation arm, heating means and stirring means. The reaction mixture was agitated and heated at atmospheric pressure to about 197° C. over a period of about 30 minutes under a nitrogen blanket whereby by-product methyl alcohol was distilled off. The reaction mixture was held at about 197° C. for about 2 hours. Then, the temperature of the reaction mixture was allowed to rise in order to distill off any remaining by-product comprising methyl alcohol and excess ethylene glycol, and form the desired polyester prepolymer product. After about 30 minutes, the temperature had risen to about 230° C. at which time the formed prepolymer was cooled under a nitrogen blanket.

The half-time of the zinc cyanide catalyst was thirty-seven minutes.

EXAMPLE VI

Fifty grams of the prepolymer product of Example V was combined with 0.02 gram of antimony trioxide in a reaction vessel equipped with a nitrogen inlet, a vacuum source, a distillation arm, stirring means, and heating means. The pressure within the reaction vessel was reduced to from about 0.1 to about 0.05 mm. of mercury at 285° C. under a nitrogen blanket and the reaction mixture was agitated under these conditions for about three hours to bring about the polycondensation of the prepolymer and formation of the polyester resin. The resin product obtained had an intrinsic viscosity of 0.94, a melting point of about 259° C., and a carboxyl content value of 46.6 (meq./kg.).

The intrinsic viscosities of the polyester products in the above examples were determined in a 60% phenol and 40% tetrachloroethane solution (wt./wt.) at 30° C.

The results in the above examples indicate that the presence of cadmium cyanide, zinc cyanide or calcium cyanide during the transesterification step of the present method facilitates the preparation of and improves the polyester prepolymer formed and in turn the resulting polyester resin product. Through the use of the present method, the transesterification reaction is accelerated and a transesterified product is formed which is suitable for polycondensation into a highly polymeric linear polyester resin. The resulting polyester products have high molecular weights, as indicated by their intrinsic viscosities, high melting points, and sufficiently low carboxyl content values so as to make them particularly suitable for use in preparing polyester filaments.

It will be apparent that various different embodiments may be made practicing this invention without departing from the spirit and scope thereof and, therefore, it is not intended to be limited except as indicated in the appended claims.

We claim:
1. In a process for the preparation of filament-forming polyethylene terephthalate resin wherein dimethyl terephthalate and ethylene glycol are transesterified and the resulting transesterified product is polycondensed in the presence of a polycondensation catalyst, the improvement comprising carrying out the said transesterification in the presence of a catalytic amount of a cyanide transesterification catalyst selected from the group consisting of cadmium cyanide, zinc cyanide and calcium cyanide.

2. The process of claim 1 wherein the cyanide is present in an amount of from about 0.01% to about 0.20%, based on the weight of dimethyl terephthalate in the reaction mixture.

3. The process of claim 1 wherein the cyanide is cadmium cyanide.

4. The process of claim 1 wherein the cyanide is calcium cyanide.

5. The process of claim 1 wherein the cyanide is zinc cyanide.

References Cited

UNITED STATES PATENTS 3,228,913   1/1966   Nesty et al.

WILLIAM H. SHORT, *Primary Examiner.*

LOUISE P. QUAST, *Assistant Examiner.*

U.S. Cl. X.R.

260—475